United States Patent [19]
Gordon

[11] Patent Number: 6,014,948
[45] Date of Patent: Jan. 18, 2000

[54] PROTECTIVE STRUCTURE FOR SHADING AND COOLING DAIRY COWS

[76] Inventor: R. Robert Gordon, 3225 E. Baseline Rd., Apt. 2070, Gilbert, Ariz. 85234

[21] Appl. No.: 08/919,920

[22] Filed: Aug. 28, 1997

[51] Int. Cl.⁷ ...................................................... A01K 1/00
[52] U.S. Cl. ................................................................ 119/449
[58] Field of Search .................................. 119/436, 444, 119/448, 449; 52/73, 198, 302.3

[56] References Cited

U.S. PATENT DOCUMENTS

| | | |
|---|---|---|
| 2,233,766 | 3/1941 | Bogert . |
| 2,247,186 | 6/1941 | Chelazzi . |
| 3,530,831 | 9/1970 | Conover . |
| 3,552,358 | 1/1971 | Launder . |
| 4,443,387 | 4/1984 | Gordon . |
| 4,476,809 | 10/1984 | Bunger . |
| 4,574,737 | 3/1986 | Bugeja ................................ 119/448 X |
| 4,693,852 | 9/1987 | Gordon . |
| 5,062,387 | 11/1991 | Anderson . |
| 5,119,762 | 6/1992 | Yockey et al. ........................... 119/448 |
| 5,544,622 | 8/1996 | Weelink . |

FOREIGN PATENT DOCUMENTS

| | | | |
|---|---|---|---|
| 171117 | 2/1986 | European Pat. Off. ............... | 119/448 |
| 1 320 293 | 6/1973 | United Kingdom . | |

*Primary Examiner*—Robert P. Swiatek
*Attorney, Agent, or Firm*—Cahill, Sutton & Thomas, P.L.C.

[57] ABSTRACT

A shelter for covering and protecting dairy cows in hot climates includes a feeding area as well as a loafing area for cows to chew their cud after feeding. The feeding area and loafing area are covered by a roof structure for shading the cows from the sun. Evaporative coolers extend through the roof structure to circulate cool air within such structure. The structure has one or more retractable walls to help retain cool air within the structure while permitting cows to enter or exit. The roof structure channels any rainwater into the interior of the structure to assist in flushing waste from the feeding area.

15 Claims, 3 Drawing Sheets

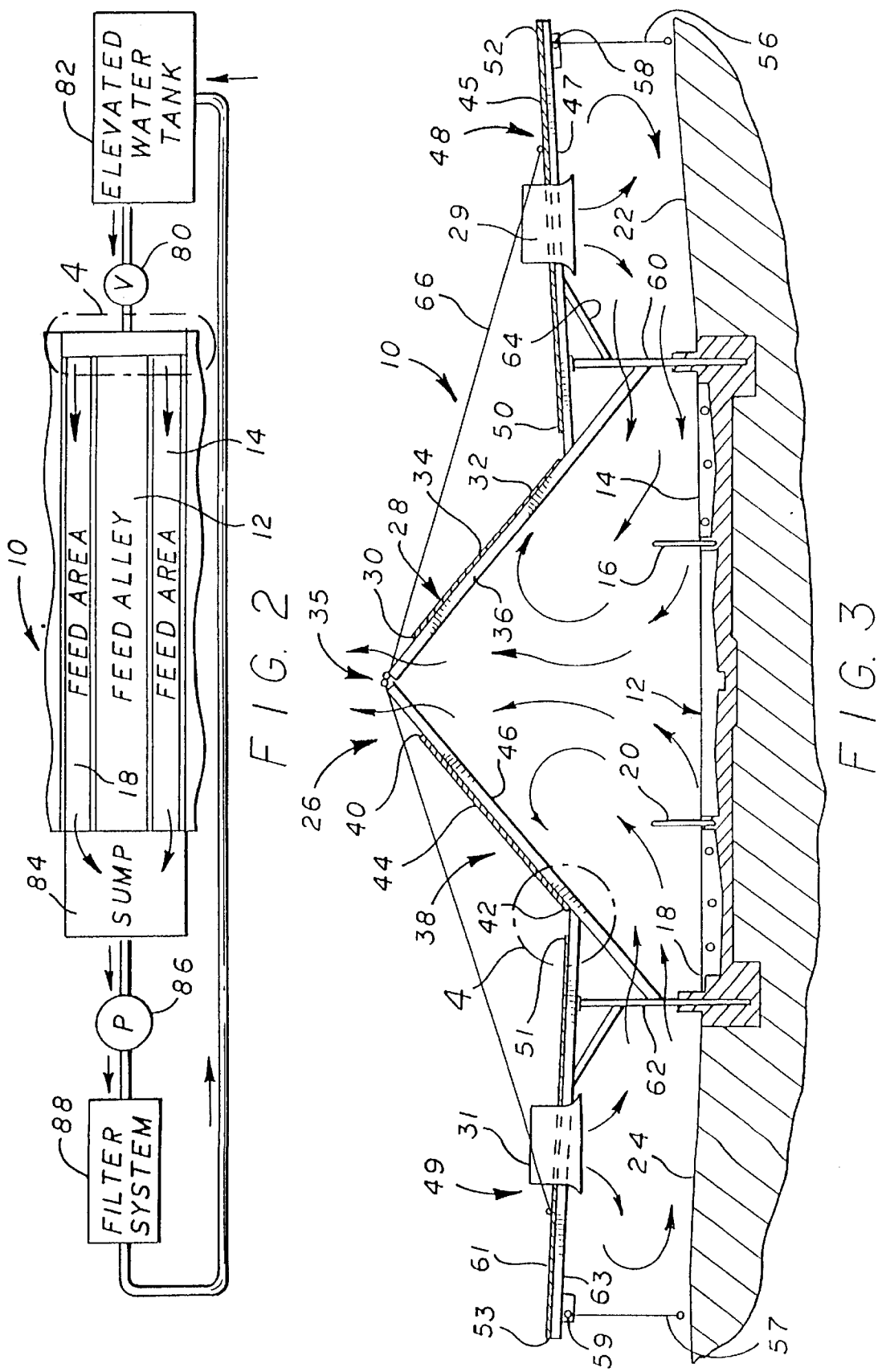

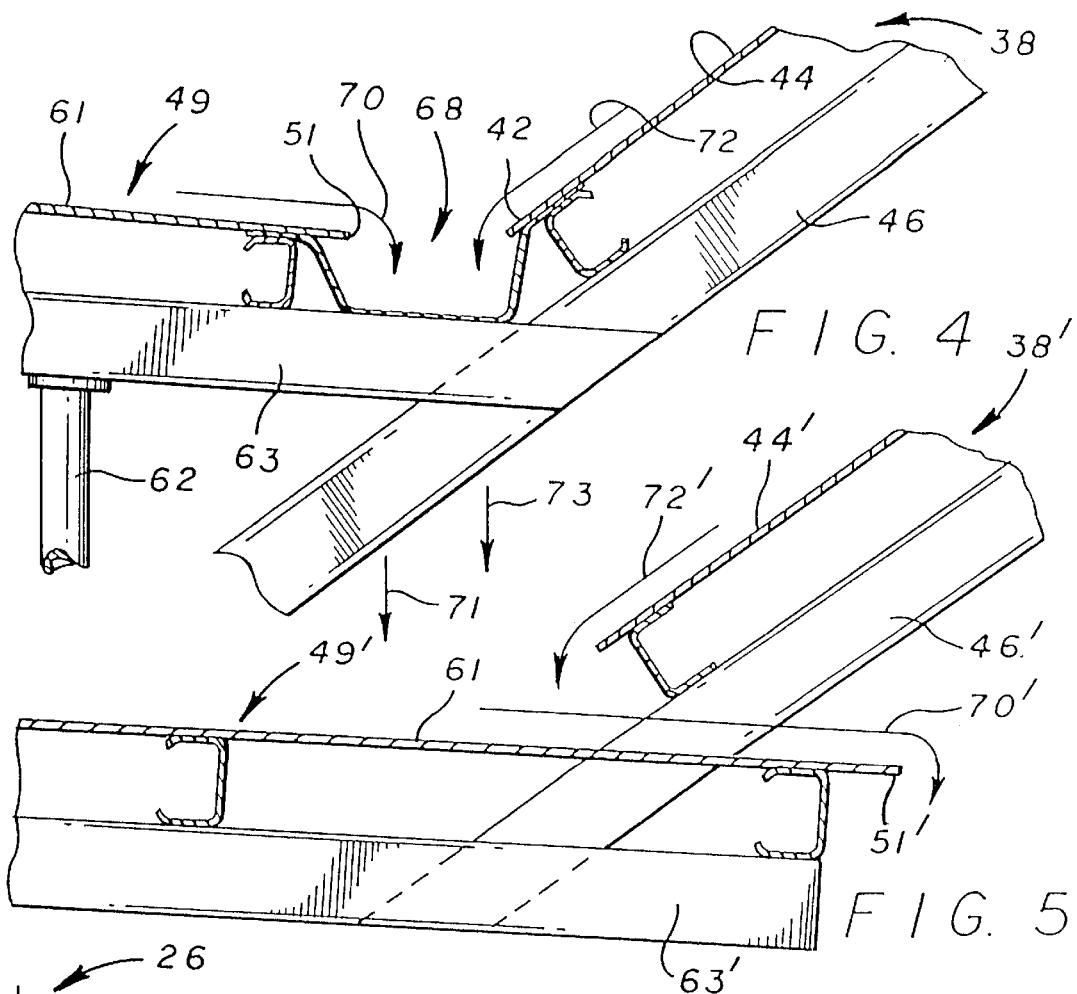
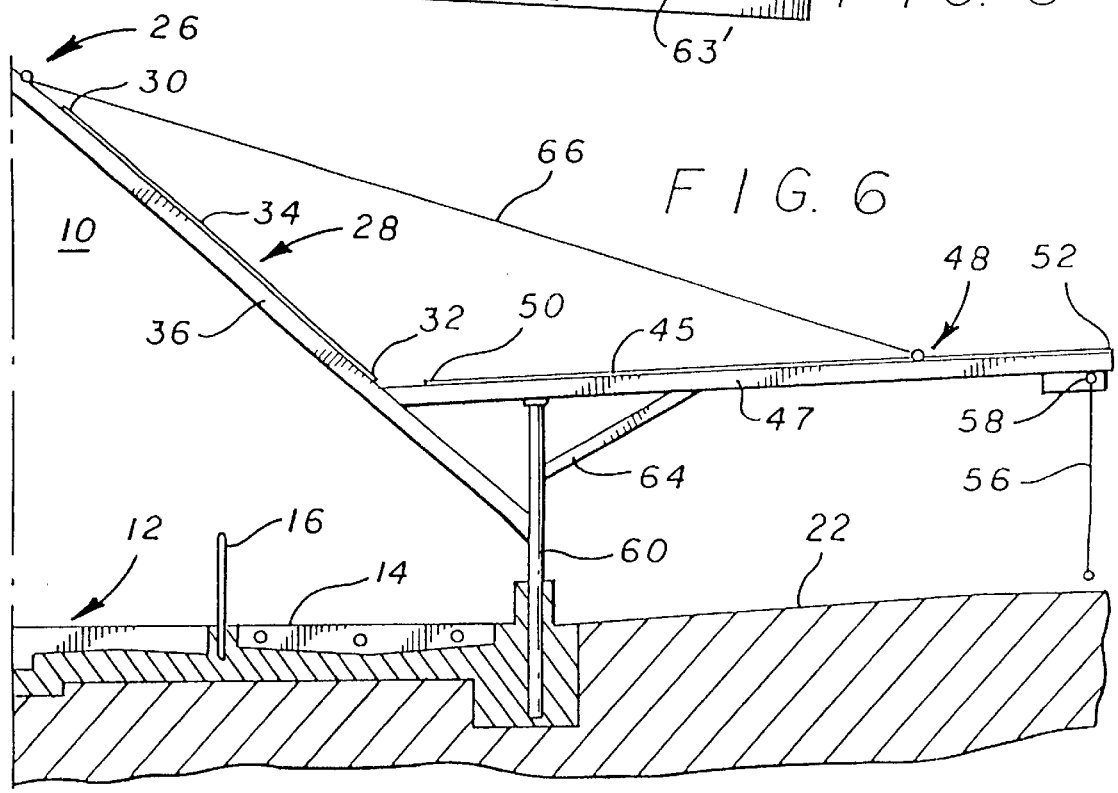

PROTECTIVE STRUCTURE FOR SHADING AND COOLING DAIRY COWS

BACKGROUND OF THE INVENTION

1. Field of the Invention

The present invention relates generally to protective structures for dairy cows and, more particularly, to a structure which shades and cools dairy cows in semi-arid climates.

2. Description of the Related Art

To maintain proper health of dairy cows raised in semi-arid climates, some form of protection from the sun and heat must be provided. For example, a corral structure for evaporatively cooling dairy cows is disclosed in Applicant's prior U.S. Pat. No. 4,443,387. It is also known to provide an open-air roof above a feeding area to protect cows from the direct rays of the sun overhead while feeding. While such structures are helpful to shade the cows during feeding, daytime temperatures in semi-arid climates often rise to dangerously high levels, even in shaded areas.

After feeding, dairy cows spend time chewing their cud. While the dairy cows may be shaded during feeding, they typically move away from the feeding area to chew their cud, and hence leave the protective shade of known roof structures.

In addition, known shaded feeding structures have roofs which channel any rainwater to the peripheral edges of the roof, where such rainwater falls and collects upon the ground. Such damp areas foster the growth of bacteria, and pose an additional health risk to such dairy cows.

U.S. Pat. No. 3,552,358 to Launder discloses a poultry house incorporating an air-conditioning system and manure-disposal system. While the apparatus disclosed therein may perform adequately for poultry, such system would not have practical use in conjunction with much-larger dairy cows. British Pat. No. 1,320,293 issued to Cadborough Engineering Company Limited discloses an effluent disposal system for an animal house; however, no mechanism is provided thereby for eliminating puddling of rainwater that drains from the roof of the disclosed structure. Likewise, U.S. Pat. No. 5,062,387 to Anderson discloses an animal housing facility incorporating a waste collection pit, but again, rainwater draining from such structure simply rolls off of the roof and puddles along the base of such structure.

Accordingly, it is an object of the present invention to provide a protective structure for dairy cows which both shades the cows during feeding and keeps the cows cool and dry while they chew their cud.

Another object of the present invention is to provide such a protective structure which keeps the cows cool while permitting convenient access to the interior structure for cleaning.

A still further object of the present invention is to prevent any rainwater that falls upon such structure from pooling around the perimeter of the structure as might breed bacteria.

Still another object of the present invention is to advantageously use any collected rainwater to assist in flushing waste products from the protective structure.

It is yet another object of the present invention to provide such a protective structure that is inexpensive and easy to construct.

It is also an object of the present invention to provide a protective structure to shade and cool dairy cows and which minimizes the volume of air within such structure that needs to be cooled.

These and other objects of the present invention will become more apparent to those skilled in the art as the description thereof proceeds.

SUMMARY OF THE INVENTION

Briefly described, and in accordance with a preferred embodiment of the present thereof, the present invention relates to a protective structure for dairy cows that generally extends along a central longitudinal axis. A first roof member extends generally parallel to the central longitudinal axis at an incline between an upper end generally supported above the central longitudinal axis of the protective structure and a lower end. Likewise, a second roof member extends generally parallel to the central longitudinal axis at an incline between an upper end generally supported above the central longitudinal axis of the protective structure and a lower end thereof. The upper end of the second roof member extends proximate and parallel to the upper end of the first roof member.

A first series of supports are provided for supporting the lower end of the first roof member above the floor of the protective structure; similarly, a second series of supports are provided for supporting the lower end of the second roof member above the floor of the protective structure.

The protective structure includes at least a third roof member that extends generally parallel to the central longitudinal axis of the protective structure. The third roof member has a first edge supported by the first series of supports adjacent the lower end of the first roof member above the floor of the protective structure. The third roof member includes a second edge opposite to the aforementioned first edge. A first elongated tension member extends generally between the upper end of the first roof member and the second edge of the third roof member for maintaining the second edge of said third roof member elevated above the floor of the protective structure; this first elongated tension member thereby supports the third roof member in a cantilevered fashion.

In accordance with a preferred embodiment of the present invention, the protective structure is symmetrical about the central longitudinal axis. In this event, the protective structure includes a fourth roof member which extends generally parallel to the central longitudinal axis and having a first edge supported by the second series of supports adjacent the lower end of the second roof member above the floor of the protective structure. This fourth roof member includes a second outer edge opposite to the first inner edge. A second elongated tension member extends generally between the upper end of the second roof member and the second edge of the fourth roof member for elevating the second edge of the fourth roof member above the floor of the protective structure, thereby supporting the fourth roof member in cantilevered fashion.

In the preferred embodiment of the present invention, the first and second roof members cover a feeding area of the protective structure, and the third and fourth roof members cover first and second loafing areas, respectively. The feeding area includes a feed alley extending along the central longitudinal axis of the protective structure for receiving animal feed; this feed alley lies below and is shaded by the first and second roof members. A first trough extends alongside the feed alley and below said first roof member, adjacent the first series of supports, and generally below the lower end of the first roof member and below the first edge of the third roof member. A first set of stanchions extend alongside the feed alley and separate the first trough therefrom for allowing cows standing in the first trough to access animal feed. If desired, a second trough can be provided on the opposite side of the feed alley, separated therefrom by a second set of stanchions.

One aspect of the present invention relates to the use of collected rainwater to help flush waste from the first trough. In this regard, the first elongated tension member supports the second edge of the third roof member at a higher elevation than the first edge of the third roof member. In addition, the lower edge of the first roof member and the first edge of the third roof member form a channel leading to the interior of the protective structure above the first trough. Accordingly, rain falling upon the first roof member and rolling toward the lower end thereof, and rain falling upon the third roof member and rolling toward the first edge thereof, is deposited into the first trough below the first and third roof members to aid in flushing cow waste from said first trough. Preferably, the second and fourth roof members form a similar rain water collection system for helping to flush cow waste from the second trough.

The air within the protective structure can be evaporatively cooled to reduce temperatures within the protective structure. At least one evaporative cooler can advantageously be mounted upon the third roof member for introducing cooled air into the loafing area below the third roof member. Ideally, cooler air within the protective structure is separated from warmer outdoor air by a curtain suspended adjacent the second edge of the third roof member for dividing the space below the third roof member from the outdoors. This curtain can be retractable to facilitate grooming of the loafing area. In order to exhaust warmer air within the protective structure, a vent can be formed between the upper ends of the first and second roof members for allowing warmer air to escape from the protective structure.

The protective structure of the present invention extends along the aforementioned central longitudinal axis between first and second ends. To further shade dairy cows, and to help retain cool air within such structure, the protective structure preferably includes opposing end walls to close off the opposing ends thereof

BRIEF DESCRIPTION OF THE DRAWINGS

FIG. 2 is a schematic view of a waste flushing system that may be used to supplement rain water flushing of waste from the troughs in which the cows stand during feeding.

FIG. 3 is a sectional view of the protective structure shown in FIG. 1 and illustrating the flow of cooling air throughout such protective structure.

FIGS. 4 and 5 are cross-sectional enlargements, in accordance with alternate embodiments, of the intersection between the upper roof section covering the feeding alley and the lower roof section covering the loafing area to guide collected rainwater into the trough below to help flush waste therefrom.

FIG. 6 is an enlarged partial sectional view of the protective structure shown in FIG. 3.

DETAILED DESCRIPTION OF THE PREFERRED EMBODIMENT

Figure 1:
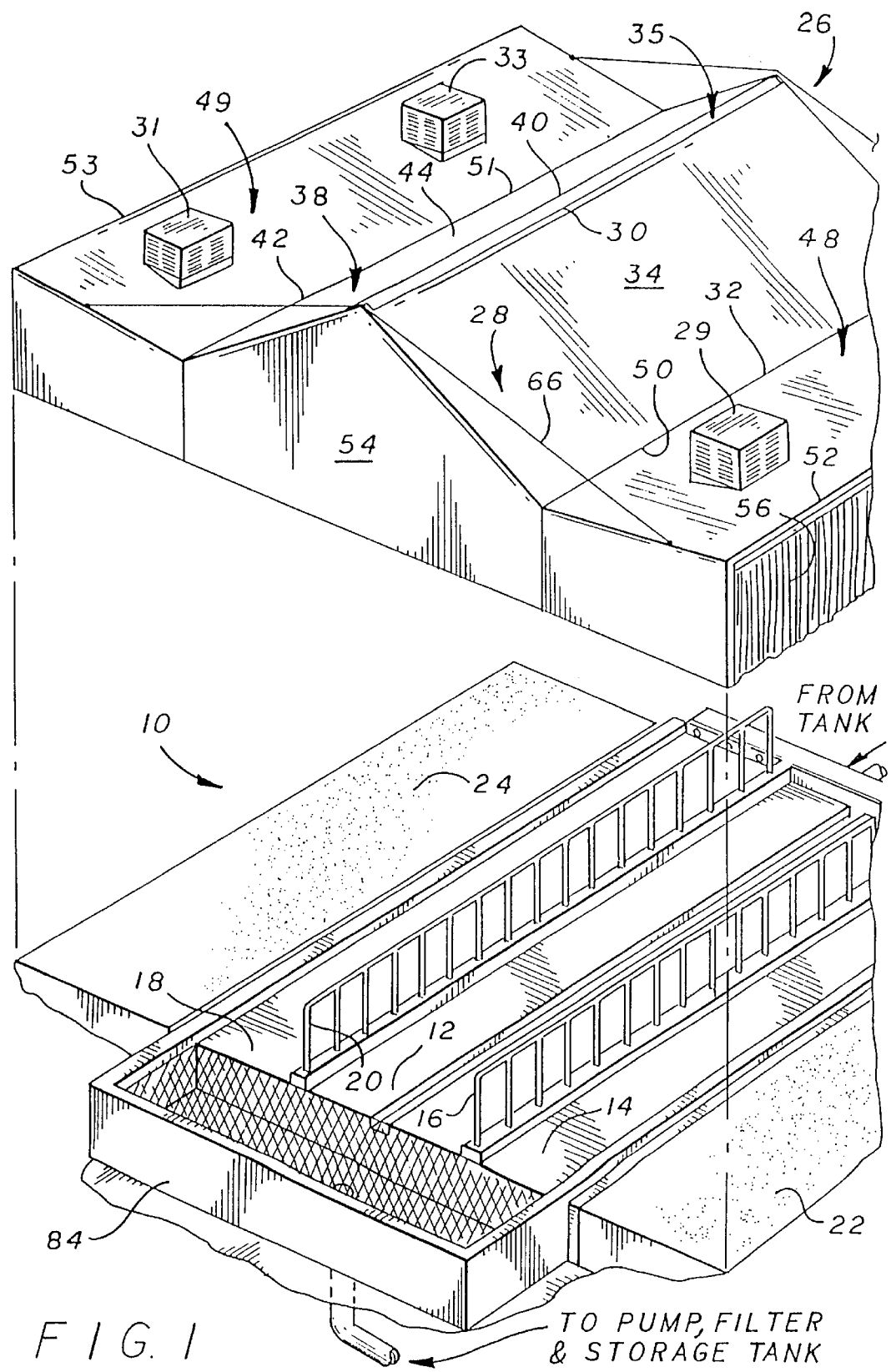
FIG. 1 is an exploded perspective view of a protective structure for dairy cows constructed in accordance with the teachings of the present invention.

FIGS. 1, 3 and 6 collectively illustrate a protective structure for dairy cows in accordance with a preferred embodiment of the present invention. Within such figures, the protective structure is designated generally by reference numeral 10, and includes a central feed alley 12 extending along the central longitudinal axis of protective structure 10 for receiving animal feed. A first trough 14 extends alongside feed alley 12, and is separated therefrom by a first set of stanchions 16 for allowing cows (not shown) standing in first trough 14 to extend their heads and necks between stanchions 16 to access animal feed deposited in feed alley 12. As shown in FIGS. 1 and 3, protective structure 10 preferably includes a second trough 18 extending along the opposite side of feed alley 12 and separated therefrom by a second set of stanchions 20 for allowing cows (not shown) standing in second trough 18 to extend their heads and necks between stanchions 20 to access animal feed. As indicated in FIGS. 3 and 6, central feed alley 12 and troughs 14 and 18 may be formed by, or upon, a concrete foundation. In addition, so-called loafing areas 22 and 24 are provided on opposite sides of troughs 14 and 18, respectively, for providing a cool place for cows to rest and chew their cud after feeding.

To shield cows feeding in troughs 14 and 18, or chewing their cud in loafing areas 22 and 24, from the overhead sun, protective structure 10 includes a roof assembly 26 which includes a first inclined roof member 28 extending generally parallel to the central longitudinal axis of protective structure 10. The upper end 30 of first roof member 28 is supported generally above feed alley 12; first roof member 28 slopes downwardly toward an opposing lower end 32, which is generally supported above first trough 14 for shading animal feed in feed alley 12, as well as any cows feeding from first trough 14. By way of example, first roof member 28 may be formed from flat or corrugated steel or fiberglass panels 34 supported by underlying structural metal beams 36. As indicated in FIG. 3, a similar sloped roof member 38, referred to herein as a second roof member, extends generally parallel to the central longitudinal axis of protective structure 10, wherein the upper end 40 of second roof member 38 is supported generally above feed alley 12 proximate upper end 30 of first roof member 28. Second roof member 38 also slopes downwardly toward an opposing lower end 42 supported above second trough 18. Thus, second roof member 38 also serves to shade animal feed deposited in feed alley 12, as well as any cows feeding from second trough 18. Like first roof member 28, second roof member 38 may be formed from steel or fiberglass panels 44 supported by structural metal beams 46. First roof member 28 and second roof member 38 together form an inverted V-shaped pitched roof covering central feed alley 12 and portions of the first and second troughs 14 and 18.

Roof assembly 26 also includes a third roof member 48 extending generally parallel to the longitudinal axis of protective structure 10 and having a first inner edge 50 supported above first trough 14 adjacent lower end 32 of first roof member 28; third roof member 48 also includes an opposing second outer edge 52 remote from first trough 14. Third roof member 48 serves to shade cows standing in first trough 14, as well as cows loafing below third roof member 48 in loafing area 22. First edge 50 of third roof member 48 is slightly lower than the second edge 52. Third roof member 48 can be constructed in a manner similar to that of roof members 28 and 38, and may include roofing panels 45 secured to generally horizontal, structural steel support beams 47. Similarly, roof assembly 26 preferably includes a fourth roof member 49 extending generally parallel to the central longitudinal axis of protective structure 10 and having a first edge 51 supported above second trough 18 adjacent lower end 42 of second roof member 38; the opposing second edge 53 of fourth roof member 49 extends remote from second trough 18. Fourth roof member 48 shades cows standing in second trough 18, as well as cows loafing below fourth roof member 49 in loafing area 24. First edge 51 of fourth roof member 49 is slightly lower than the second edge 53 thereof Like third roof member 48, fourth roof member 49 may be formed of roofing panels 61 and generally horizontal, structural steel support beams 63.

As indicated in FIG. 1, the ends of the protective structure are preferably closed off by end walls, such as end wall 54. The end walls need not necessarily be structural walls, and may be made from stretched canvas. The primary purpose of such end walls is to block the sun's rays from entering below roof assembly 26, and to separate cooled air within protective structure 10 from warmer air outside.

The sides of protective structure 10 are selectively closed by slotted curtains, such as curtains 56 and 57 shown in FIGS. 1, 3 and 6, for allowing cows to enter or exit protective structure 10 at will while retaining cool air within protective structure 10. Curtain 56 is suspended adjacent and just below second end 52 of third roof member 48 for physically dividing the loafing area 22 below third roof member 48 from the outdoors. Preferably, such curtains are retractable; as indicated in FIGS. 3 and 6, curtains 56 and 57 can be automatically raised and/or lowered by motorized shafts 58 and 59, respectively. A control system (not shown) includes sensors for sensing light, temperature, and humidity. It might be desired to raise curtains 56 and 57 when, for example, the sun sets, or when the weather is mild, or when the humidity within protective structure 10 is unusually high. The control system also includes a manual override switch, as when it is necessary to retract the curtain to drive a tractor over loafing areas 22 and 24 to groom such loafing areas.

In order for protective structure 10 to maintain a reasonably cool interior temperature during summer days, evaporative coolers, such as those designated 29, 31 and 33, are preferably provided. As indicated in FIGS. 1 and 3, evaporative cooler 29 is supported upon third roof member 48. Evaporative cooler 29 is of the downdraft type, and a hole is formed in third roof member 48 below evaporative cooler 29 for allowing cooled outside air to circulate over loafing area 22 and into the space above trough 14 and feed alley 12. Evaporative cooler 31 is similarly supported above loafing area 24.

Those skilled in the art will appreciate that, by bifurcating roof assembly 26 to include steeply inclined first and second roof members 28 and 38, and relatively flat third and fourth roof members 48 and 49, the evaporative coolers are located closer to the cows in loafing areas 22 and 24, thereby avoiding the need for extensive ductwork in order to bring cooled air down to the cows. In addition, the overall volume of the space to be cooled within protective structure 10 is also minimized, since each half of the roof assembly 26 has a "knee" formed therein, as compared with a conventional pitched-roof structure.

The upper ends 30 and 40 of roof members 28 and 38 stop short of the apex of the pitched roof assembly 26, thereby leaving a longitudinally extending passage or slit 35 at the top of roof assembly 26. Passage 35 serves as an exhaust vent for allowing warm air to escape from the interior of protective structure 10.

It will be recalled that one of the objectives of the present invention is to channel rainwater to help flush cow waste from troughs 14 and 18 of protective structure 10, and to prevent rainwater runoff from pooling around the perimeter thereof In this regard, rainwater that falls upon first roof member 28 rolls toward lower end 32 thereof Likewise, rainwater falling upon third roof member 48 rolls inwardly toward the first edge 50 thereof The rainwater that is directed to lower end 32 of roof member 28, and the rainwater that is directed to the inner edge 50 of roof member 48, is then guided into first trough 14 in a manner described in greater detail below.

Similarly, rainwater that falls upon second roof member 38 rolls toward lower end 42 thereof, and rainwater falling upon fourth roof member 49 rolls inwardly toward the inner edge 51 thereof The rainwater that is directed to lower end 42 of roof member 38, and the rainwater that is directed to the inner edge 51 of roof member 49, is then guided into second trough 18 in a manner to be described below.

Referring to FIGS. 3 and 6, roof assembly 26 is supported by a series of vertical posts or supports, including vertical support posts 60 and 62. Vertical support post 60 is anchored within the concrete foundation of protective structure 10 adjacent trough 14. Vertical support post 60 extends to a height of approximately ten feet above the ground and directly supports inner edge 50 of third roof member 48, as by securing support beam 47 to the upper end of vertical support post 60. Sloped support beam 36, which helps support first roof member 28, is secured to vertical support post 60 at approximately the midpoint thereof In this regard, the lower end of support beam 36 extends beyond the lower end 32 of roof panel 34. Thus, vertical support post 60 serves to support both the lower end 32 of first roof member 28 and the inner edge 50 of third roof member 48 above first trough 14.

The upper ends of support beams 36 and 46 are secured to each other and form a joint under tension at the apex of roof assembly 26. Support beam 47, which supports roof panel 45, is supported in a cantilevered fashion; the innermost end of support beam 47 is secured to support beam 36. A strut 64 extends between vertical support post 60 and support beam 47. In addition, a series of tension cables, like elongated tension cable 66, extend from the peak of roof assembly 26 to third roof member 48 to further support end 52 thereof above loafing area 22. This cantilevered support of roof members 48 and 49 avoids the need for vertical support posts within loafing areas 22 and 24, thereby allowing a tractor to more easily groom such loafing areas.

Turning to FIG. 4, the joinder of lower end 42 of second roof member 38 and the inner edge 51 of fourth roof member 49 is shown in greater detail. It will be noted that there is a gap, or channel, 68 formed between lower end 42 of roof member 38 and inner edge 51 of roof member 49. Rainwater rolling inwardly along fourth roof member 49 falls over the edge 51, as indicated by arrows 70 and 71; in similar fashion, rainwater rolling downwardly along second roof member 38 falls over the edge of lower end 42, as indicated by arrows 72 and 73. Such rainwater falls into second trough 18 to aid in flushing cow waste from second trough 18. Likewise, rainwater that strikes either first roof member 28 or third roof member 48 is deposited into first trough 14 to aid in flushing cow waste therefrom. Moreover, since all of such rainwater is channeled into protective structure 10, such rainwater does not pool on the ground around the perimeter of protective structure 10.

FIG. 5 illustrates an alternate embodiment of the joinder of the lower end of second roof member 38 and the inner edge of fourth roof member 49. Within FIG. 5, those structural elements that correspond to elements already described above in conjunction with FIG. 4 are designated by like primed reference numerals. In this alternate embodiment, roof panel 49' extends inwardly just beyond lower end 42' of second roof member 28'. Thus, rainwater which falls over the edge of lower end 42' of second roof member 38' is first intercepted by roofing panel 61', which then guides such rainwater 70' into the interior of protective structure 10 for being deposited into trough 18.

To further facilitate the flushing of cow waste from troughs 14 and 18, a flushing system is provided for use with protective structure 10. FIG. 2 illustrates such flushing system schematically. Within FIG. 2, troughs 14 and 18 are shown extending on opposing sides of central feed alley 12. A water control valve 80 receives water from elevated water storage tank 82 and periodically allows water to rapidly flow into troughs 14 and 18 from one end of such troughs toward the opposite ends thereof A sump 84 is provided at the opposite ends of troughs 14 and 18 to collect the flushing water and waste swept up therein; this sump 84 is illustrated in FIG. 1 as being built largely underground adjacent protective structure 10. The material deposited into sump 84 is pumped by pump 86 through a filter 88, and the liquid which exits therefrom is pumped back to elevated water storage tank 82 for reuse. The solid wastes collected by filter 88 are periodically removed for use as fertilizer or the like.

Those skilled in the art will now appreciate that a protective structure for dairy cows has been described which both shades the cows during feeding and keeps the cows cool and dry while they chew their cud. The disclosed protective structure is relatively inexpensive, easy to construct, and keeps the cows cool while nonetheless permitting convenient access to the interior of the structure for cleaning and grooming. Falling rain is prevented from pooling around the perimeter of the structure in a manner that might breed bacteria; indeed, falling rainwater is used to assist in flushing cow waste from the protective structure.

While the present invention has been described with respect to a preferred embodiment thereof, such description is for illustrative purposes only, and is not to be construed as limiting the scope of the invention. Various modifications and changes may be made to the described embodiment by those skilled in the art without departing from the true spirit and scope of the invention as defined by the appended claims.

I claim:

1. A protective structure for dairy cows, the protective structure including a floor and generally extending along a central longitudinal axis, and comprising in combination:
   a. a first roof member extending generally parallel to the central longitudinal axis, said first roof member being inclined and having an upper end generally supported above the central longitudinal axis of said protective structure;
   b. a second roof member extending generally parallel to the central longitudinal axis, said second roof member being inclined and having an upper end generally supported above the central longitudinal axis of said protective structure, the upper end of said second roof member extending proximate and parallel to the upper end of said first roof member;
   c. a first plurality of supports for supporting the lower end of said first roof member above the floor of the protective structure;
   d. a second plurality of supports for supporting the lower end of said second roof member above the floor of the protective structure;
   e. a third roof member extending generally along the central longitudinal axis and having a first edge supported by said first plurality of supports adjacent the lower end of said first roof member above the floor of the protective structure, said third roof member including a second edge opposite to said first edge;
   f. a first elongated tension member extending generally between the upper end of said first roof member and the second edge of said third roof member for maintaining the second edge of said third roof member elevated above the floor of the protective structure and supporting said third roof member in cantilevered fashion;
   g. a fourth roof member extending generally along the central longitudinal axis and having a first edge supported by said second plurality of supports adjacent the lower end of said second roof member above the floor of the protective structure, said fourth roof member including a second edge opposite to said first edge thereof; and
   h. a second elongated tension member extending generally between the upper end of said second roof member and the second edge of said fourth roof member for maintaining the second edge of said fourth roof member elevated above the floor of the protective structure and supporting said fourth roof member in cantilevered fashion.

2. The protective structure for dairy cows recited by claim 1 wherein said first and second roof members cover a feeding area of the protective structure, and wherein said third roof member covers a first loafing area of the protective structure.

3. The protective structure for dairy cows recited by claim 2 wherein said fourth roof member covers a second loafing area of the protective structure.

4. The protective structure described by claim 1 further including a curtain suspended adjacent the second edge of said third roof member for dividing the space below said third roof member from the outdoors.

5. The protective structure described by claim 4, wherein said curtain is retractable.

6. The protective structure described by claim 1 including at least one evaporative cooler mounted upon said third roof member for introducing cooled air into the area below said third roof member.

7. The protective structure described by claim 6, further including a vent formed between the upper ends of said first and second roof members for exhausting air from said protective structure.

8. The protective structure recited by claim 1, wherein the protective structure extends along the central longitudinal axis between first and second ends, said protective structure further including opposing end walls to close off the opposing ends of said protective structure.

9. A protective structure for dairy cows, the protective structure including a floor and generally extending along a central longitudinal axis, and comprising in combination:
   a. a first roof member extending generally parallel to the central longitudinal axis, said first roof member being inclined and having an upper end generally supported above the central longitudinal axis of said protective structure;
   b. a second roof member extending generally parallel to the central longitudinal axis, said second roof member being inclined and having an upper end generally supported above the central longitudinal axis of said protective structure, the upper end of said second roof member extending proximate and parallel to the upper end of said first roof member;

c. a first plurality of supports for supporting the lower end of said first roof member above the floor of the protective structure;

d. a second plurality of supports for supporting the lower end of said second roof member above the floor of the protective structure;

e. a third roof member extending generally along the central longitudinal axis and having a first edge supported by said first plurality of supports adjacent the lower end of said first roof member above the floor of the protective structure, said third roof member including a second edge opposite to said first edge;

f. a first elongated tension member extending generally between the upper end of said first roof member and the second edge of said third roof member for maintaining the second edge of said third roof member elevated above the floor of the protective structure and supporting said third roof member in cantilevered fashion;

g. a feed alley extending along the central longitudinal axis of the protective structure for receiving animal feed, said feed alley lying below said first and second roof members;

h. a first trough extending alongside said feed alley and below said first roof member, said first trough lying adjacent said first plurality of supports and below the lower end of said first roof member and below the first edge of said third roof member; and i. stanchions extending alongside said feed alley and separating said first trough from said feed alley for allowing cows standing in said first trough to access animal feed.

10. The protective structure for dairy cows recited by claim 9, wherein said first elongated tension member supports the second edge of said third roof member at a higher elevation than the first edge of said third roof member, the lower edge of said first roof member and the first edge of said third roof member forming a channel leading to the interior of said protective structure above said first trough, whereby rain falling upon said first roof member and rolling toward the lower end thereof, and rain falling upon said third roof member and rolling toward the first edge thereof, is deposited into the first trough below said first and third roof members to aid in flushing cow waste from said first trough.

11. The protective structure described by claim 9, further including:

a. a fourth roof member extending generally along the central longitudinal axis and having a first edge supported by said second plurality of supports adjacent the lower end of said second roof member above the floor of the protective structure, said fourth roof member including a second edge opposite to said first edge thereof;

b. a second elongated tension member extending generally between the upper end of said second roof member and the second edge of said fourth roof member for maintaining the second edge of said fourth roof member elevated above the floor of the protective structure and supporting said fourth roof member in cantilevered fashion;

c. a second trough extending alongside said feed alley on a side thereof opposite said first trough;

d. a second set of stanchions extending alongside said feed alley and separating said second trough from said feed alley for allowing cows standing in said trough to access animal feed.

12. The protective structure described by claim 11 wherein said second elongated tension member supports the second edge of said fourth roof member at a higher elevation than the first edge of said fourth roof member, the lower edge of said second roof member and the first edge of said fourth roof member forming a channel leading to the interior of said protective structure above said second trough, whereby rain falling upon said second roof member and rolling toward the lower end thereof, and rain falling upon said fourth roof member and rolling toward the first edge thereof, is deposited into the second trough below said second and fourth roof members to aid in flushing cow waste from said second trough.

13. A protective structure for dairy cows, the protective structure including a floor and generally extending along a central longitudinal axis, and comprising in combination:

a. a first roof member extending generally parallel to the central longitudinal axis, said first roof member being inclined and having an upper end generally supported above the central longitudinal axis of said protective structure;

b. a second roof member extending generally parallel to the central longitudinal axis, said second roof member being inclined and having an upper end generally supported above the central longitudinal axis of said protective structure, the upper end of said second roof member extending proximate and generally parallel to the upper end of said first roof member;

c. a first plurality of supports for supporting the lower end of said first roof member above the floor of the protective structure;

d. a second plurality of supports for supporting the lower end of said second roof member above the floor of the protective structure;

e. a third roof member extending generally along the central longitudinal axis and having a first edge supported by said first plurality of supports adjacent the lower end of said first roof member above the floor of the protective structure;

f. a fourth roof member extending generally along the central longitudinal axis and having a first edge supported by said second plurality of supports adjacent the lower end of said second roof member above the floor of the protective structure;

g. a feed alley extending along the central longitudinal axis of the protective structure for receiving animal feed, said feed alley lying below said first and second roof members;

h. a first trough extending alongside said feed alley and generally below said first roof member, said first trough lying generally adjacent said first plurality of supports and generally below the lower end of said first roof member and generally below the first edge of said third roof member; and i. a second trough extending alongside said feed alley and generally below said second roof member, said second trough lying generally adjacent said second plurality of supports and generally below the lower end of said second roof member and generally below the first edge of said fourth roof member.

14. The protective structure for dairy cows recited by claim 13 including:

a. first stanchions extending alongside said feed alley and separating said first trough from said feed alley for allowing cows standing in said first trough to access animal feed; and b. second stanchions extending alongside said feed alley and separating said second trough from said feed alley for allowing cows standing in said second trough to access animal feed.

15. A protective structure for dairy cows, the protective structure including a floor and generally extending along a central longitudinal axis, and comprising in combination:

a. a first roof member extending generally parallel to the central longitudinal axis, said first roof member being inclined and having an upper end generally supported above the central longitudinal axis of said protective structure;

b. a second roof member extending generally parallel to the central longitudinal axis, said second roof member being inclined and having an upper end generally supported above the central longitudinal axis of said protective structure, the upper end of said second roof member extending proximate and generally parallel to the upper end of said first roof member;

c. a first plurality of supports for supporting the lower end of said first roof member above the floor of the protective structure;

d. a second plurality of supports for supporting the lower end of said second roof member above the floor of the protective structure;

e. a third roof member extending generally along the central longitudinal axis and having a first edge supported by said first plurality of supports adjacent the lower end of said first roof member above the floor of the protective structure;

f. a feed alley extending along the central longitudinal axis of the protective structure for receiving animal feed, said feed alley lying below said first and second roof members;

g. a first trough extending alongside said feed alley and generally below said first roof member, said first trough lying generally adjacent said first plurality of supports and generally below the lower end of said first roof member and generally below the first edge of said third roof member;

h. said third roof member having a second edge opposite the first edge thereof, the second edge of said third roof member being supported at a higher elevation than the first edge thereof, the lower edge of said first roof member and the first edge of said third roof member forming a channel leading to the interior of said protective structure above said first trough, whereby rain falling upon said first roof member and rolling toward the lower end thereof, and rain falling upon said third roof member and rolling toward the first edge thereof, is deposited into the first trough below said first and third roof members to aid in flushing cow waste from said first trough.

* * * * *